United States Patent
Sugino et al.

(10) Patent No.: US 10,400,922 B2
(45) Date of Patent: Sep. 3, 2019

(54) THREADED JOINT FOR STEEL PIPES

(71) Applicants: NIPPON STEEL & SUMITOMO METAL CORPORATION, Tokyo (JP); VALLOUREC OIL AND GAS FRANCE, Aulnoye-Aymeries (FR)

(72) Inventors: Masaaki Sugino, Nishinomiya (JP); Yukihiro Nishikawa, Bandar Seri Begawan (BN)

(73) Assignees: NIPPON STEEL CORPORATION, Tokyo (JP); VALLOUREC OIL AND GAS FRANCE, Aulnoye-Aymeries (FR)

(*) Notice: Subject to any disclaimer, the term of this patent is extended or adjusted under 35 U.S.C. 154(b) by 50 days.

(21) Appl. No.: 15/512,612

(22) PCT Filed: Oct. 5, 2015

(86) PCT No.: PCT/JP2015/005063
§ 371 (c)(1),
(2) Date: Mar. 20, 2017

(87) PCT Pub. No.: WO2016/056222
PCT Pub. Date: Apr. 14, 2016

(65) Prior Publication Data
US 2017/0292638 A1    Oct. 12, 2017

(30) Foreign Application Priority Data

Oct. 6, 2014   (JP) ................................ 2014-205899

(51) Int. Cl.
*F16L 15/00* (2006.01)
*E21B 17/03* (2006.01)
(Continued)

(52) U.S. Cl.
CPC ............ *F16L 15/002* (2013.01); *E21B 17/03* (2013.01); *E21B 17/042* (2013.01); *F16L 15/04* (2013.01)

(58) Field of Classification Search
CPC ..... F16L 15/001; F16L 15/004; F16L 15/002; F16L 15/006; F16L 15/009; F16L 15/04
(Continued)

(56) References Cited

U.S. PATENT DOCUMENTS 4,153,283 A * 5/1979 Hellmund ............. F16L 15/004
285/334
4,629,221 A * 12/1986 Lumsden ................ E02D 5/523
285/328

(Continued)

FOREIGN PATENT DOCUMENTS

EP    1 030 029    8/2000
EP    2325435     5/2011
(Continued)

*Primary Examiner* — Aaron M Dunwoody
(74) *Attorney, Agent, or Firm* — Clark & Brody

(57) ABSTRACT

A threaded joint is constructed of a pin and a box, the box having an outside diameter less than 104% of an outside diameter of a tubular body having the pin. The box includes, in order from an end of the box toward the tubular body: a lip portion and a female threaded portion, the lip portion including a shoulder surface and a sealing surface. The pin includes a shoulder surface, a sealing surface, and a male threaded portion. The lip portion of the box has a nose portion disposed between the shoulder surface and the sealing surface and an annular portion disposed between the sealing surface and the female threaded portion. The nose portion and the annular portion are not in contact with the pin, and a length of the annular portion is longer than a thread pitch of the female threaded portion.

6 Claims, 4 Drawing Sheets

(51) Int. Cl.
*E21B 17/042* (2006.01)
*F16L 15/04* (2006.01)

(58) Field of Classification Search
USPC .................................. 285/333, 334, 390
See application file for complete search history.

(56) References Cited

U.S. PATENT DOCUMENTS

| | | | | |
|---|---|---|---|---|
| 6,056,324 A | * | 5/2000 | Reimert | E21B 17/042 |
| | | | | 285/18 |
| 7,506,900 B2 | | 3/2009 | Carcagno et al. | |
| 8,056,940 B2 | * | 11/2011 | Morgan | E21B 17/046 |
| | | | | 285/332.1 |
| 2002/0033603 A1 | | 3/2002 | Pallini et al. | |
| 2008/0238094 A1 | * | 10/2008 | Craig | E21B 17/042 |
| | | | | 285/331 |
| 2008/0265575 A1 | * | 10/2008 | Charvet-Quemin | |
| | | | | F16L 15/004 |
| | | | | 285/331 |
| 2010/0181763 A1 | | 7/2010 | Mallis et al. | |
| 2010/0283239 A1 | * | 11/2010 | Gillot | E21B 17/08 |
| | | | | 285/332.3 |
| 2011/0227338 A1 | * | 9/2011 | Pollack | F16L 15/004 |
| | | | | 285/355 |
| 2012/0175846 A1 | * | 7/2012 | Hedrick | E21B 17/042 |
| | | | | 277/314 |
| 2014/0183862 A1 | | 7/2014 | Angelle et al. | |
| 2014/0352837 A1 | * | 12/2014 | Yamamoto | F16L 57/005 |
| | | | | 138/96 T |
| 2015/0252921 A1 | * | 9/2015 | Schulte | F16L 15/001 |
| | | | | 285/390 |
| 2016/0208962 A1 | * | 7/2016 | Sugino | F16L 15/004 |

FOREIGN PATENT DOCUMENTS

| | | |
|---|---|---|
| JP | 2004-504563 | 2/2004 |
| JP | 2009-505003 | 2/2009 |
| JP | 2010-520981 | 6/2010 |
| JP | 2013-511672 | 4/2013 |
| JP | 2013-536339 | 9/2013 |
| WO | 2009/083523 | 7/2009 |
| WO | 2011/044690 | 4/2011 |

\* cited by examiner

THREADED JOINT FOR STEEL PIPES

TECHNICAL FIELD

The present invention relates to a threaded joint for use in connecting steel pipes or tubes (hereinafter also referred to as "steel pipes").

BACKGROUND ART

In oil wells, natural gas wells, and the like (hereinafter also collectively referred to as "oil wells"), steel pipes referred to as Oil Country Tubular Goods (OCTG) are used for extraction of underground resources. The steel pipes are sequentially connected to each other, and threaded joints are used for the connection.

Threaded joints for steel pipes are classified into two types: coupling-type joints and integral-type joints. A coupling-type threaded joint is constituted by a pair of tubular goods that are connected to each other, of which one is a steel pipe and the other is a coupling. In this case, the steel pipe includes male threaded portions formed on the outer peripheries at both ends thereof, and the coupling includes female threaded portions formed on the inner peripheries at both ends thereof. Thus, the steel pipe and the coupling are connected to each other. An integral-type threaded joint is constituted by a pair of steel pipes as tubular goods that are connected to each other, without a separated coupling being used. In this case, each steel pipe includes a male threaded portion formed on the outer periphery at one end thereof and a female threaded portion formed on the inner periphery at the other end thereof. Thus, the one steel pipe and the other steel pipe are connected to each other.

Also, threaded joints for steel pipes are sometimes classified into types such as a flush type, semi-flush type, and slim type based on the outside diameter of the joint portion. A slim type threaded joint is defined using, as a measure, a coupling in which the area of the critical cross section is substantially equal to that of the pipe body (hereinafter also referred to as a "standard coupling"). Specifically, a slim type threaded joint refers to one in which the maximum outside diameter of the joint portion is smaller than the outside diameter of the standard coupling. A flush type threaded joint and a semi-flush type threaded joint are defined using, as a measure, the pipe body. Specifically, a flush type threaded joint refers to one in which the maximum outside diameter of the joint portion is substantially equal to the outside diameter of the pipe body. A semi-flush type threaded joint refers to one in which the maximum outside diameter of the joint portion falls between that of a flush type threaded joint and that of a slim type threaded joint. In short, regarding the joint portion, flush type threaded joints have the smallest maximum outside diameter, semi-flush type threaded joints have the next smallest maximum outside diameter, and the slim type threaded joints have the largest outside diameter.

The term "critical cross section" as used herein refers to a cross section at an end of the engagement region of the threaded portion, i.e., at a position where the area of the cross section for bearing tensile loads is a minimum. The position of the critical cross section and the cross-sectional area thereof are factors in determining the tensile strength of the threaded joint. There are no definitions for clearly distinguishing among the flush type, semi-flush type, and slim type. However, as a general rule for threaded joints for steel pipes currently on the market, those in which the maximum outside diameter of the joint portion is up to about 104% of that of the pipe body are referred to as the flush type or the semi-flush type, and those in which the maximum outside diameter of the joint portion is up to about 108% of that of the pipe body are referred to as the slim type.

In general, the joint portion at the tubular end where a male threaded portion is disposed is referred to as a pin because it includes an element that is inserted into a female threaded portion. On the other hand, the joint portion at the tubular end where a female threaded portion is disposed is referred to as a box because it includes an element that receives a male threaded portion. Pins and boxes both have a tubular shape because they are constituted by end portions of tubular goods.

In service environments, threaded joints for steel pipes are subjected to high pressure from fluids (e.g., gas or liquid) present in the exterior and the interior. Hereinafter, pressure from the exterior is also referred to as external pressure and pressure from the interior is also referred to as internal pressure. Under these circumstances, threaded joints for steel pipes are required to exhibit high sealing performance against external pressure and internal pressure.

Threaded joints for steel pipes employ a tapered threaded portion constituted by a male threaded portion of the pin and a female threaded portion of the box. In threaded joints having a tapered threaded portion, the male threaded portion of the pin and the female threaded portion of the box engage in intimate contact with each other. Thus, a thread seal is formed. In addition, in order to supplement the sealing performance of the thread seal, an external seal may be provided and an internal seal may be provided, separately from the thread seal.

An external seal is constituted by a sealing surface formed on the inner periphery of the end region of the box and a sealing surface correspondingly formed on the outer periphery of the pin. When these sealing surfaces come into interference contact with each other at high contact pressure, the external seal is formed. The external seal primarily serves to prevent external fluids from accidentally invading the region of the thread seal so as to contribute to ensuring sealing performance against external pressure.

An internal seal is constituted by a sealing surface formed on the outer periphery of the end region of the pin and a sealing surface correspondingly formed on the inner periphery of the box. When these sealing surfaces come into interference contact with each other at high contact pressure, the internal seal is formed. The internal seal primarily serves to prevent internal fluids from accidentally invading the region of the thread seal so as to contribute to ensuring sealing performance against internal pressure.

Typically, in the region of the external seal, the wall thickness of the box is thinner than that of the pin. Thus, in the case where high internal pressure has been loaded to the threaded joint and the threaded joint as a whole has swollen radially, the region of the external seal in the box easily expands radially to plastically deform. In this case, the region of the external seal in the box remains radially expanded after removal of the internal pressure, and as a result, the contact pressure between the sealing surfaces of the external seal is significantly decreased. If a high external pressure is loaded to the threaded joint in this state, the sealing surfaces of the external seal easily become separated. When this occurs, the external fluid invades the region of the thread seal beyond the external seal and finally invades the interior of the threaded joint. This problem is referred to as an external pressure leak.

In the past, various proposals have been made on techniques to ensure the sealing performance of the external seal.

For example, techniques of amplifying contact pressure at the external seal are disclosed in U.S. Pat. No. 7,506,900 (Patent Literature 1), European Patent Application Publication No. 2325435 (Patent Literature 2), International Publication No. WO2009/083523 (Patent Literature 3), International Publication No. WO2011/044690 (Patent Literature 4), United States Patent Application Publication No. 2010/181763 (Patent Literature 5), and United States Patent Application Publication No. 2008/265575 (Patent Literature 6).

Patent Literatures 1 and 2 disclose a technique in which a nose portion is provided in the end region of the box. The nose portion extends along the pipe axis from an end of the sealing surface of the external seal, adjacent the end, and does not contact the pin. The stiffness of the nose portion itself increases deformation resistance of the region of the external seal. As a result, radially outward plastic deformation is inhibited in the region of the external seal of the box, whereby a sufficient contact pressure between the sealing surfaces is ensured.

Patent Literatures 3 to 5 disclose a technique in which a shoulder surface is provided on the end of the box. The pin has a shoulder surface corresponding to the shoulder surface of the box. The shoulder surfaces of the box and the pin are brought into contact and pressed against each other by the screwing of the pin and serve as a stopper for restricting the screwing of the pin. In addition, in a made up state (also referred to as "fastened state"), the shoulder surfaces of the pin and the box serve to impart the so-called thread tightening axial force to the load flanks of the male threaded portion of the pin and the load flanks of the female threaded portion of the box. The shoulder surfaces of the box and the pin are inclined with respect to a plane perpendicular to the pipe axis toward the direction in which screwing of the pin advances and they come into pressure contact with each other in a hooked manner. Because the pressure contact between the shoulder surfaces is in a hooked manner, the region of the external seal of the box receives a reaction force that acts in a direction to cause it to shrink radially. As a result, radially outward plastic deformation is inhibited in the region of the external seal of the box, whereby a sufficient contact pressure between the sealing surfaces is ensured.

The technique of Patent Literature 6 employs both the technique of Patent Literatures 1 and 2, in which a nose portion is provided in the end region of the box, and the technique of Patent Literatures 3 to 5, in which a shoulder surface is provided on the end of the box so as to come into pressure contact with the pin in a hooked manner.

CITATION LIST

Patent Literature

Patent Literature 1: U.S. Pat. No. 7,506,900
Patent Literature 2: European Patent Application Publication No. 2325435
Patent Literature 3: International Publication No. WO2009/083523
Patent Literature 4: International Publication No. WO2011/044690
Patent Literature 5: United States Patent Application Publication No. 2010/181763
Patent Literature 6: United States Patent Application Publication No. 2008/265575

SUMMARY OF INVENTION

Technical Problem

The techniques of Patent Literatures 1 to 6 provide the advantages effectively in the case of threaded joints in which the wall thickness of the box is large relative to the wall thickness of the pin, e.g., coupling-type threaded joints, threaded joints of the slim type but for use in small diameter steel pipes, etc. However, in the case of certain types of threaded joints for which expanding of the box outside diameter is limited and which thus have a box outside diameter substantially equal to that of the pin, e.g., threaded joints of the flush type, of the semi-flush type, or of the slim type, which are widely employed in large diameter steel pipes, the advantages of the techniques of Patent Literatures 1 to 6 as described above cannot be sufficiently provided and therefore it is impossible to prevent external pressure leak. This is because, in those threaded joints, the wall thickness of the box is significantly thin with respect to that of the pin, and accordingly the wall thickness of the nose portion in the end region of the box is thin and the width of the shoulder surface on the end of the box is small.

An object of the present invention is to provide a threaded joint for steel pipes having the following characteristics: reliably ensuring sealing performance of the external seal.

Solution to Problem

A threaded joint for steel pipes according to an embodiment of the present invention includes a tubular pin and a tubular box, the pin and the box being made up (also referred to as "fastened") by screwing the pin onto the box, the box having an outside diameter less than 104% of an outside diameter of a tubular body having the pin. The box includes, in order from an end of the box toward a tubular body: a lip portion and a tapered female threaded portion, the lip portion including a shoulder surface and a sealing surface. The pin includes: a shoulder surface; a sealing surface; and a tapered male threaded portion, the shoulder surface being in contact with the shoulder surface of the box in a made up state, the sealing surface being in contact with the sealing surface of the box in a made up state, the tapered male threaded portion engaging with the tapered female threaded portion in a made up state. The shoulder surface of the box and the shoulder surface of the pin are inclined with respect to a plane perpendicular to the pipe axis toward a direction in which the screwing of the pin advances. The lip portion of the box has: a nose portion disposed between the shoulder surface and the sealing surface; and an annular portion disposed between the sealing surface and the female threaded portion. The nose portion and the annular portion are not in contact with the pin in a made up state, and the annular portion has a length along the pipe axis, the length being longer than a thread pitch of the female threaded portion.

The above threaded joint may be configured such that the pin includes a complemental sealing surface disposed on an end region of the pin and the box includes a complemental sealing surface that is in contact with the complemental sealing surface of the pin in a made up state.

The above threaded joint may be configured such that the pin includes a complemental shoulder surface disposed on an end of the pin and the box includes a complemental shoulder surface that is in contact with the complemental shoulder surface of the pin in a made up state.

The above threaded joint may be configured such that the male threaded portion of the pin and the female threaded portion of the box each comprise two-step threads composed of two separated portions along the pipe axis. In this threaded joint, the pin may include an intermediate sealing surface disposed between a first-step male threaded portion and a second-step male threaded portion, and the box may include an intermediate sealing surface that is in contact with the intermediate sealing surface of the pin in a made up state. In addition, the pin may include an intermediate shoulder surface disposed between the first-step male threaded portion and the second-step male threaded portion, and the box may include an intermediate shoulder surface that is in contact with the intermediate shoulder surface of the pin in a made up state.

The above threaded joint may preferably be configured such that a circumferential tensile yield strengths of the box in a region including the nose portion and in a region including the sealing surface is at least 105% of a tensile yield strength of the box in a region including the tubular body having the box.

The above threaded joint may be configured such that, in a longitudinal section along the pipe axis, shapes of the sealing surfaces of the box and the pin are each one of the following or a combination of two or more of the following: a straight line; a circular arc; an elliptical arc; and a quadratic curve.

The above threaded joint may be configured such that the tubular body having the pin has an outside diameter of at least 170 mm.

Advantageous Effects of Invention

A threaded joint for steel pipes according to the present invention has the following significant advantages: being capable of reliably ensuring sealing performance of the external seal.

DESCRIPTION OF EMBODIMENTS

Figure 1:
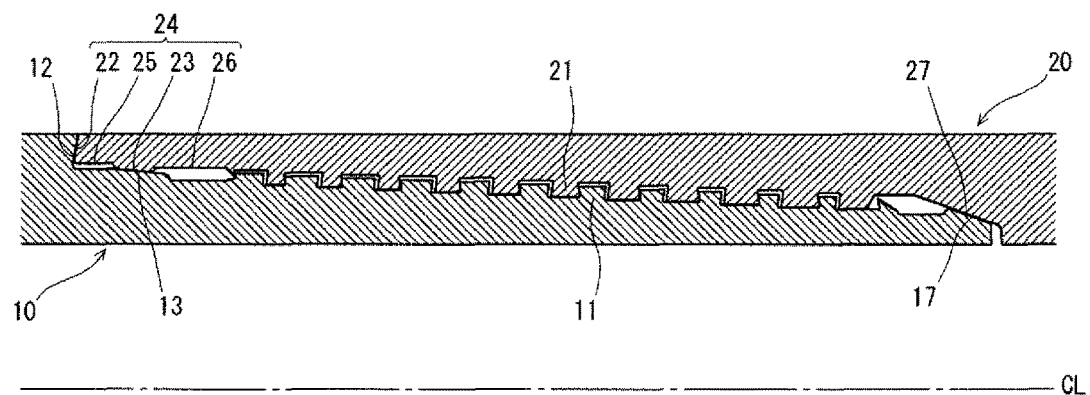
FIG. 1 is a longitudinal sectional view of a threaded joint for steel pipes according to an embodiment of the present invention.

As described above, in threaded joints for steel pipes, expanding of the box outside diameter is restricted. Thus, the wall thickness of the box, particularly of the end region thereof, is thin, naturally. In the case of threaded joints in which a nose portion is provided in the end region of the box, the wall thickness of the nose portion is thin because of the thin thickness of the end region of the box. As a result, the stiffness of the nose portion itself cannot be sufficiently ensured. In the case of threaded joints in which a shoulder surface is provided on the end of the box so as to come into pressure contact with the pin in a hooked manner, the width of the shoulder surface is small because of the thin thickness of the end region of the box. As a result, the radial component of the reaction force of the shoulder surface on the end of the box that amplifies the contact pressure of the external seal is limited.

Thus, in either case, the effect of amplifying the contact pressure at the external seal peaks out.

In view of the above, the present inventors considered taking advantage of the thin thickness of the end region of the box. Specifically, the present inventors conceived that, if the region of the external seal in the box can be pressed against the region of the external seal in the pin when a high external pressure has been loaded to the threaded joint, it may be possible to amplify the contact pressure at the external seal. After intense research, they have found that the following configurations are effective.

The end region of the box is configured as follows. An annular groove is formed contiguous with the sealing surface of the external seal at a side adjacent the female threaded portion. The formation of the annular groove creates a thin-walled annular portion between the sealing surface and the female threaded portion. The length of the annular portion along the pipe axis is long to some extent. With the presence of the annular portion, the length from the female threaded portion to the sealing surface of the external seal is elongated.

With this configuration, when a high external pressure has been loaded to the threaded joint, the annular portion and the region of the external seal continuous with the annular portion shrink radially. This causes the region of the external seal of the box to be pressed against the region of the external seal of the pin, thereby making it possible to amplify the contact pressure at the external seal.

In short, the box is provided with a nose portion disposed on the end region and a shoulder surface disposed on the end so as to come into pressure contact with the pin in a hooked manner. Furthermore, the box is provided with an annular portion disposed between the region of the external seal and the female threaded portion. These produce a synergistic effect, thereby achieving significant amplification of contact pressure at the external seal. Consequently, it is possible to reliably ensure sealing performance of the external seal.

The threaded joint for steel pipes of the present invention has been made based on the above findings. Embodiments of the threaded joint for steel pipes according to the present invention are described below.

Figure 2:
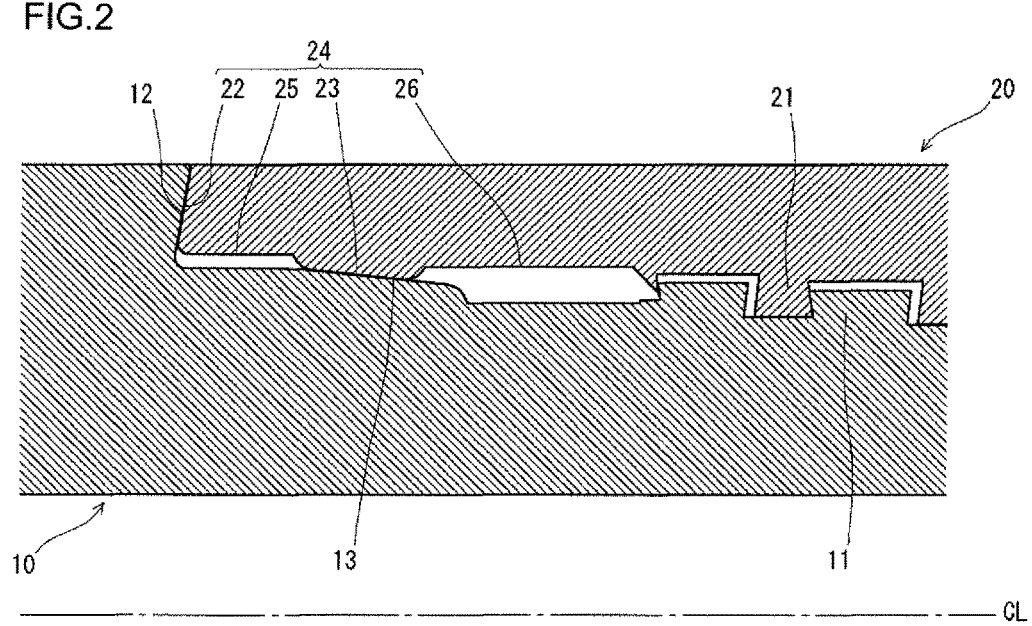
FIG. 2 is an enlarged longitudinal sectional view of an end region of the box in the threaded joint for steel pipes shown in FIG. 1.
Figure 3:
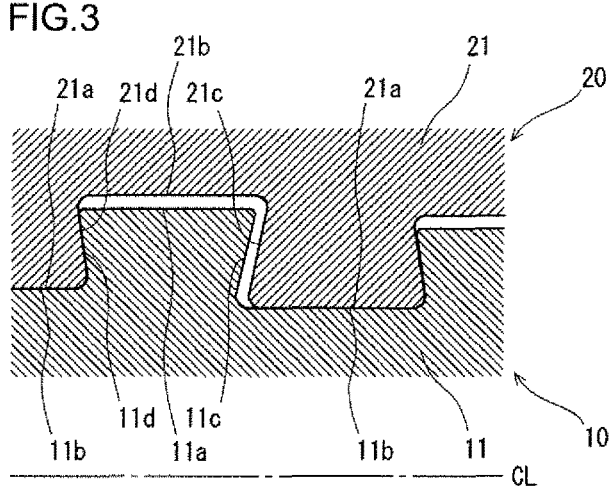
FIG. 3 is an enlarged longitudinal sectional view of a region of the threaded portion in the threaded joint for steel pipes shown in FIG. 1.

FIG. 1 is a longitudinal sectional view of a threaded joint for steel pipes according to an embodiment of the present invention. FIG. 2 is an enlarged longitudinal sectional view of the end region of the box in the threaded joint for steel pipes shown in FIG. 1. FIG. 3 is an enlarged longitudinal sectional view of a region of the threaded portion in the threaded joint for steel pipes shown in FIG. 1. As shown in FIGS. 1 to 3, the threaded joint of the present embodiment is an integral-type threaded joint and is constructed of a pin 10 and a box 20. It is to be noted that the threaded joint of the present embodiment may be employed as a coupling-type threaded joint.

The threaded joint of the present embodiment is intended for configurations in which the wall thickness of the end region of the box 20 is thin. Thus, the outside diameter of the box 20 is in the range of more than 100% to less than 104% of the outside diameter of the tubular body having the pin 10. The size of steel pipes to be connected by the threaded joint of the present embodiment is not particularly limited, but the threaded joint is particularly suitable for connection of large diameter steel pipes, which have a thin wall thickness in the end region of the box 20. "Large diameter steel pipes" refer to those in which the tubular body having the pin 10 has an outside diameter of at least 170 mm.

The box 20 includes, in order from the end of the box 20 toward the tubular body: a lip portion 24 and a female threaded portion 21, the lip portion 24 including a shoulder surface 22 and a sealing surface 23. The lip portion 24 extends along the pipe axis CL from an end of the female threaded portion 21, adjacent the end of the box. The lip portion has a nose portion 25 disposed between the shoulder surface 22 and the sealing surface 23 and an annular portion 26 disposed between the sealing surface 23 and the female threaded portion 21. The female threaded portion 21 is not formed in the annular portion 26.

The annular portion 26 extends along the pipe axis CL from an end of the female threaded portion 21, adjacent the end of the box, to connect with the sealing surface 23. This annular portion 26 may be created, for example, by forming an annular groove contiguous with a side of the sealing surface 23, adjacent the female threaded portion 21. That is, as shown in FIG. 2, the inside diameter of the box 20 at the annular portion 26 is larger than the minimum diameter at the sealing surface 23 and the maximum diameter at the roots 21*b* of the female threaded portion 21.

The nose portion 25 extends along the pipe axis CL from an end of the sealing surface 23, adjacent the end of the box. A shoulder surface 22 is provided on the end of the nose portion 25 (corresponding to the end of the lip portion 24 or the end of the box 20).

The shoulder surface 22 is an annular surface inclined with respect to a plane perpendicular to the pipe axis CL toward a direction in which the screwing of the pin 10 advances (a direction toward the end of the pin 10). In other words, the shoulder surface 22 is inclined in such a manner that the outer circumference side is closer to the end of the pin 10. The shape of the shoulder surface 22 in a longitudinal section along the pipe axis CL is a straight line. It is necessary that, in a longitudinal section along the pipe axis CL, the shape of the shoulder surface 22 conform to the shape of the shoulder surface 12 of the pin 10 described below. As long as this condition is met, the shape of the shoulder surface 22 may be a curved line.

The sealing surface 23 is a tapered surface and provided on the inner periphery of the lip portion 24. The sealing surface 23 has a shape corresponding to a shape of the peripheral surface of a truncated cone increasing in diameter toward the end (toward the shoulder surface 22), or a shape corresponding to a combined shape of the peripheral surface of such a truncated cone and the peripheral surface of revolution that can be obtained by rotating a curved line such as an arc about the pipe axis CL. In other words, the shape of the sealing surface 23 in a longitudinal section along the pipe axis CL is one of the following or a combination of two or more of the following: a straight line; a circular arc; an elliptical arc; and a quadratic curve.

The pin 10 includes, in order from the end adjoining the tubular body toward the end: a shoulder surface 12; a sealing surface 13; and a male threaded portion 1. The shoulder surface 12, sealing surface 13, and male threaded portion 11 of the pin 10 are provided to correspond to the shoulder surface 22, sealing surface 23, and female threaded portion 21 of the box 20, respectively.

The male threaded portion 11 of the pin 10 and the female threaded portion 21 of the box 20 are tapered threaded portions and constitute a threaded portion in which they engage with each other. As shown in FIG. 3, the male threaded portion 11 of the pin 10 includes crests 11*a*, roots 11*b*, stabbing flanks 11*c* which are in leading positions in screwing, and load flanks 11*d* located opposite from the stabbing flanks. The female threaded portion 21 of the box 20 includes crests 21*a* facing the roots 11*b* of the male threaded portion 11, roots 21*b* facing the crests 11*a* of the male threaded portion 11, stabbing flanks 21*c* facing the stabbing flanks 11*c* of the male threaded portion 11, and load flanks 21*d* facing the load flanks 11*d* of the male threaded portion 11. The tapered threaded portions of the present embodiment are constituted by dovetail threads. Thus, the load flanks 11*d*, 21*d* and the stabbing flanks 11*c*, 21*c* each have a negative flank angle.

The male threaded portion 11 of the pin 10 is able to be screwed in the female threaded portion 21 of the box 20. In a made up state, the roots 11*b* of the male threaded portion 11 are in intimate contact with the crests 21*a* of the female threaded portion 21, and the load flanks 11*d* are in intimate contact with the load flanks 21*d*. Furthermore, in a made up state, clearances are provided between the crests 11*a* of the male threaded portion 11 and the roots 21*b* of the female threaded portion 21 and between the stabbing flanks 11*c* and the stabbing flanks 21*c*, and a lubricant fills these clearances, which results in forming a thread seal. The sealing surfaces 13, 23 are brought into contact with each other by the screwing of the pin 10, and in a made up state, they intimately contact each other in interference so as to have a shrink fit. As a result, an external seal by surface-to-surface contact is formed. The shoulder surfaces 12, 22 are brought into contact and pressed against each other in a hooked manner by the screwing of the pin 10, and in a made up state, they impart the axial tightening force to the load flanks 11*d* of the male threaded portion 11 of the pin 10.

In a made up state, a clearance is provided between the nose portion 25 of the box 20 and the pin 10 so that the nose portion 25 is not in contact with the pin 10. Furthermore, a clearance is provided between the annular portion 26 of the box 20 and the pin 10 so that the annular portion 26 is not in contact with the pin 10.

In the threaded joint for steel pipes of the present embodiment configured in this manner, the region (external seal region) of the sealing surface 23, which is continuous with the nose portion 25 of the box 20, has increased resistance to deformation because of the stiffness of the nose portion 25 itself. In addition, since the shoulder surfaces 12, 22 are in pressure contact with each other in a hooked manner, the region of the external seal of the box 20 receives a reaction force that acts in a direction to cause it to shrink radially. As a result, radially outward plastic deformation is inhibited in the region of the external seal of the box 20, whereby the contact pressure between the sealing surfaces 13, 23 is amplified.

Moreover, when a high external pressure has been loaded to the threaded joint, the annular portion 26 of the box 20 and the region of the external seal thereof, which is continuous with the annular portion 26, shrink radially. This causes the sealing surface 23 of the box 20 to be pressed against the sealing surface 13 of the pin 10, thereby making it possible to amplify the contact pressure between the sealing surfaces 13, 23, in the region of the external seal.

As described above, the effect of amplifying the contact pressure at the external seal is produced synergistically. Consequently, it is possible to reliably ensure sealing performance of the external seal and thus to prevent external pressure leak.

It is noted that the threaded joint of the present embodiment secondarily includes an internal seal. Specifically, as shown in FIG. 1, the pin 10 includes a complemental sealing surface 17 disposed on the end region of the pin 10. The box 20 includes a complemental sealing surface 27 corresponding to the complemental sealing surface 17 of the pin 10. The complemental sealing surfaces 17, 27 are brought into contact with each other by the screwing of the pin 10, and in a made up state, they intimately contact each other in interference so as to have a shrink fit. As a result, an internal seal by surface-to-surface contact is formed.

The following are descriptions regarding preferred embodiments of the principal portions.

[Nose Portion]

If the length of the nose portion of the box along the pipe axis is too short, the stiffness of the nose portion itself is insufficient, and therefore the effect of amplifying the contact pressure at the external seal is not effectively produced. On the other hand, if the length of the nose portion is too long, the material cost is increased for the extended length and the manufacturing cost is increased. Moreover, the length from the shoulder surface to the sealing surface is elongated, and therefore the reaction force from the shoulder surfaces that are in pressure contact in a hooked manner does not act effectively on the region of the external seal. Accordingly, the length of the nose portion is preferably 0.5 to 3.5 times the wall thickness of the nose portion. A more preferred lower limit of the length of the nose portion is 1.5 times the wall thickness of the nose portion. A more preferred upper limit of the length of the nose portion is 3.0 times the wall thickness of the nose portion.

[Sealing Surface]

If, in a made up state, the length of contact between the sealing surfaces along the pipe axis is too short, sufficient sealing performance is not provided. On the other hand, if the length of contact between the sealing surfaces is too long, the contact pressure on the average is decreased and, as a result, sufficient sealing performance is not provided. Accordingly, the length of contact between the sealing surfaces is preferably 0.5 to 5 mm. A more preferred lower limit of the length of contact is 1 mm. A more preferred upper limit of the length of contact is 3.5 mm.

[Shoulder Surface]

If the hook angle (angle of inclination from a plane perpendicular to the pipe axis) of the shoulder surfaces is too small, the reaction force from the shoulder surfaces that are in pressure contact in a hooked manner is small. Therefore, the effect of amplifying the contact pressure at the external seal is not effectively produced. On the other hand, if the hook angle is too large, the stiffness of the region including the shoulder surface in the pin is decreased and the region of the shoulder surface becomes prone to plastic deformation, which results in adverse effects on the external seal. Accordingly, the hook angle of the shoulder surfaces is preferably 5 to 25 degrees (°). A more preferred lower limit of the hook angle is 9 degrees. A more preferred upper limit of the hook angle is 20 degrees.

[Annular Portion]

As described above, the annular portion of the box allows the region of the external seal in the box to shrink radially when external pressure has been loaded, thereby producing the effect of amplifying the contact pressure at the external seal. In addition, the annular portion of the box, owing to the interior space, serves as a threading tool relief in thread machining of the female threaded portion.

If the length of the annular portion along the pipe axis is too short, sufficient radial shrinkage of the region of the external seal will not occur, and in addition, it is difficult to provide tool relief for the threading tool. Accordingly, the length of the annular portion is set to be longer than the thread pitch of the female threaded portion. A more preferred length of the annular portion is at least 1.2 times the thread pitch of the female threaded portion. On the other hand, if the length of the annular portion is too long, the material cost is increased for the extended length and the manufacturing cost is increased. Accordingly, a preferred upper limit of the length of the annular portion is 4 times the thread pitch of the female threaded portion, and more preferably, 2.5 times the thread pitch.

It is to be noted that the threaded joint for steel pipes of the present embodiment is preferably configured as follows. As shown in FIGS. 1 and 2, a circumferential tensile yield strength of the box 20 in a region including the nose portion 25 and in a region including the sealing surface 23 is at least 105% of a tensile yield strength of the box 20 in a region including the tubular body having the box. More preferably, it is at least 110% thereof. By increasing the tensile yield strength of the box 20 in the region including the nose portion 25 and the sealing surface 23 locally as described above, radially outward deformation of the region of the external seal in the box 20 is inhibited. As a result, the effect of amplifying the contact pressure between the sealing surfaces 13, 23, is produced to a greater extent.

One technique for locally increasing the tensile yield strength is expanding the diameter of the end region of the box 20 by cold working before a series of machining operations are performed on the box 20 so that the strength is increased by strain aging. Another technique for increasing the strength is induction hardening of the end region of the box 20.

Figure 4:
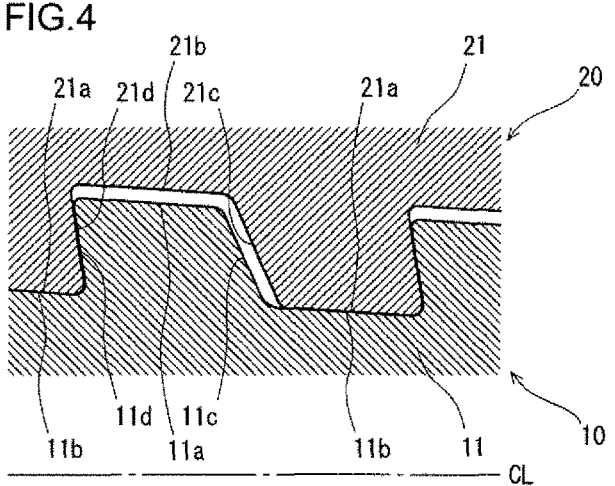
FIG. 4 is a longitudinal sectional view illustrating another example of the tapered threaded portion applicable to the threaded joint for steel pipes according to an embodiment of the present invention.
Figure 5:
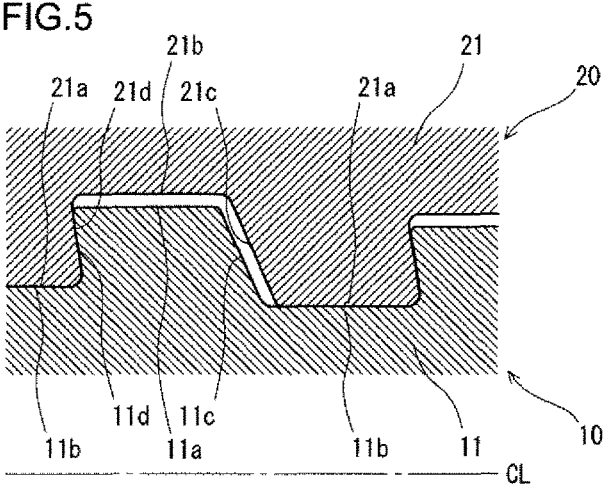
FIG. 5 is a longitudinal sectional view illustrating still another example of the tapered threaded portion applicable to the threaded joint for steel pipes according to an embodiment of the present invention.

The present invention is not limited to the embodiments described above, and various modifications may be made without departing from the spirit and scope of the present invention. For example, the threads that constitute the tapered threaded portion of the threaded joint are not limited to dovetail threads but any type of threads may be employed as long as they constitute a tapered threaded portion. For example, a tapered threaded portion constituted by buttress threads as shown in FIGS. 4 and 5 may be employed. The tapered threaded portion shown in FIG. 4 is of the type in which the crests 11a, 21a and the roots 11b, 21b are inclined with respect to the pipe axis CL. The tapered threaded portion shown in FIG. 5 is of the type in which the crests 11a, 21a and the roots 11b, 21b are parallel with respect to the pipe axis CL.

Furthermore, the threaded joint of the present embodiment may secondarily include shoulder surfaces near the internal seal. Specifically, the pin includes a complemental shoulder surface disposed on the end thereof. The box includes a complemental shoulder surface corresponding to the complemental shoulder surface of the pin. The complemental shoulder surfaces are in pressure contact with each other in a made up state, and perform functions similar to those of the shoulder surfaces near the external seal.

Furthermore, in the threaded joint of the present embodiment, the threaded portion constituted by the male threaded portion of the pin and the female threaded portion of the box may comprise two-step threads composed of two separated portions along the pipe axis. In the case where two-step threads are employed in the threaded joint, the pin may include an intermediate sealing surface disposed between a first-step male threaded portion and a second-step male threaded portion, and the box may include an intermediate sealing surface corresponding to the intermediate sealing surface of the pin. The intermediate sealing surfaces intimately contact each other in interference in a made up state, thereby forming an intermediate seal by surface-to-surface contact. Furthermore, in the case where two-step threads are employed in the threaded joint, the pin may include an intermediate shoulder surface disposed between the first-step male threaded portion and the second-step male threaded portion, and the box may include an intermediate shoulder surface corresponding to the intermediate shoulder surface of the pin. The intermediate shoulder surfaces are in pressure contact with each other in a made up state, and perform functions similar to those of the shoulder surfaces near the external seal.

The sealing surfaces, which constitute the above-described surface-to-surface seals (external seal, internal seal, and intermediate seal), are formed together with the other portions in a series of machining operations. In the operations, the tool feed rate for machining the seal surfaces is set to be lower than the feed rate for machining the other portions. This makes the sealing surfaces much smoother than the machined surfaces of the other portions.

Figure 6:
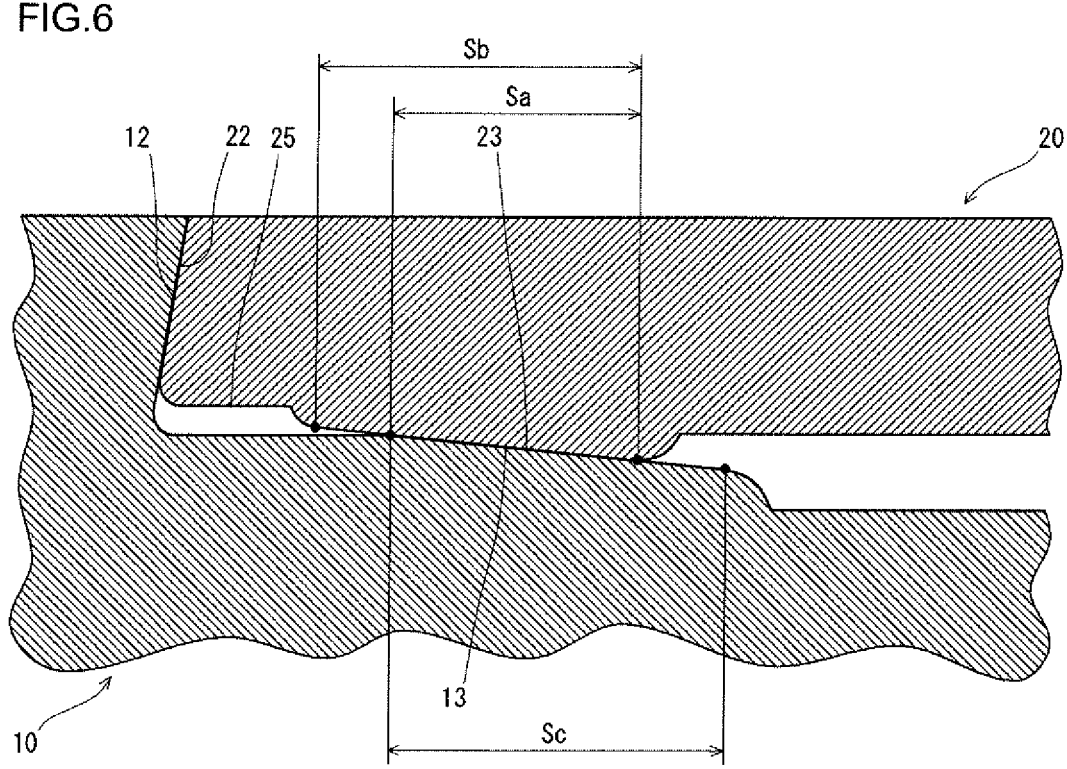
FIG. 6 is a longitudinal sectional view schematically showing a region including a surface-to-surface seal.
Figure 7:
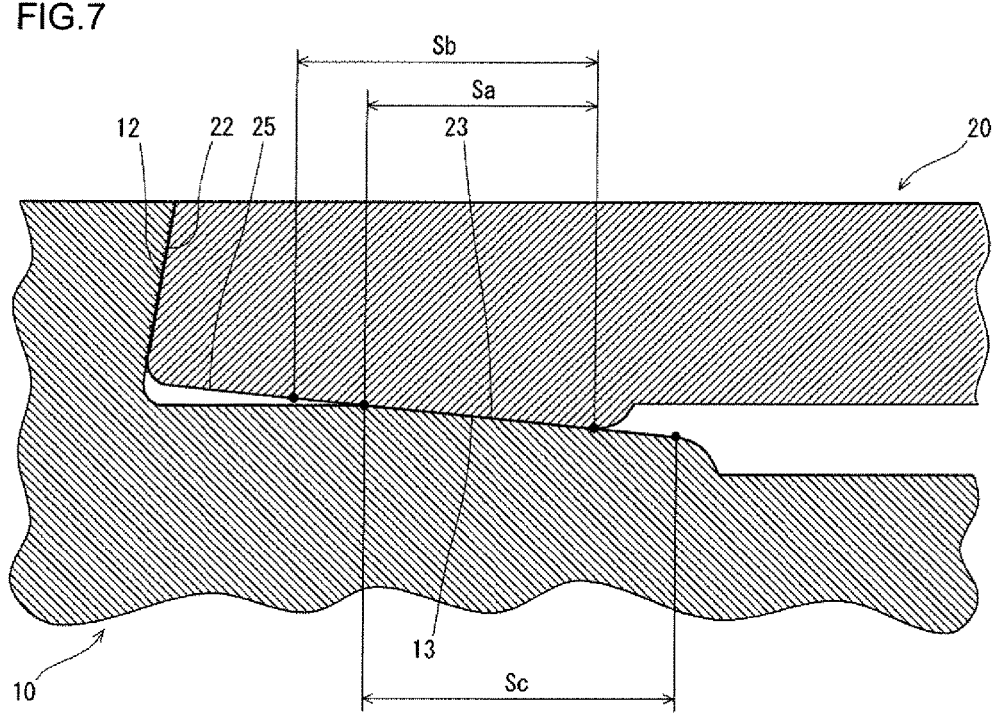
FIG. 7 is a longitudinal sectional view schematically showing a region including a surface-to-surface seal in a threaded joint having a different configuration from that of FIG. 6.

FIGS. 6 and 7 are longitudinal sectional views each schematically showing a region including the surface-to-surface seal. FIGS. 6 and 7 illustrate the external seal. As shown in FIGS. 6 and 7, the sealing surfaces 13, 23 are not limited to the region Sa where they contact each other in a made up state but are constituted by the entireties of regions Sb, Sc that have been machined to smooth surfaces as sealing surfaces. That is, the sealing surfaces 13, 23 are regions where they contact and slide relative to each other (including regions where the sliding may occur) during making up thread, and they include the entireties of the regions Sb, Sc machined to a surface roughness comparable to that of the region Sa where they contact each other in a made up state. The same applies to the internal seal and the intermediate seal.

The seal portions can be identified by removing the pin 10 from the box 20 and observing the sealing surfaces. This is because there are marks (portions where strong sliding occurred) of the seal portions (the contact region Sa in a made up state) left on the sealing surfaces.

Examples

To verify the advantages of the present invention, a numerical simulation and analysis using the elasto-plastic finite element method (FEM analysis) was carried out.

Test Conditions

In the FEM analysis, models of the threaded joint for steel pipes shown in FIG. 1 were prepared. Among these models, the length of the nose portion, the hook angle of the shoulder surface, and the length of the annular portion, in the box, were varied. Furthermore, for one of the models, cold working was applied to its pipe end region in the simulation so that the tensile yield strength of the box in the region including the nose portion and the sealing surface was increased to 110% of the tensile yield strength thereof in the region including the tubular body having the box. The varied conditions are shown in Table 1 below.

TABLE 1

| No. | Length of nose portion [mm] | Hook angle of shoulder surface [deg] | Length of annular portion [mm] | Cold Working on pipe end | Minimum value of average contact pressure at external seal | Classification |
|---|---|---|---|---|---|---|
| 1 | 9 | 15 | 12 | No | 4.3 | Inv. Example |
| 2 | 9 | 15 | 12 | Yes | 4.6 | Inv. Example |
| 3 | 0 * | 15 | 12 | No | 1.3 | Comp. Example |
| 4 | 0 * | 15 | 3.5 * | No | 1.0 | Comp. Example |
| 5 | 9 | 15 | 3.5 * | No | 3.3 | Comp. Example |
| 6 | 9 | 0 * | 12 | No | 2.9 | Comp. Example |

Remarks:
Minimum values of average contact pressure are relative values to the value of No. 4, which is assumed to be 1.
Symbol "*" indicates that the value does not satisfy the condition specified by the present invention.

Common properties regarding the material and dimensions of the steel pipes are as follows.

Steel pipe size: 14 [inch], 112.6 [lb/ft] (outside diameter of 355.6 mm and wall thickness of 20.32 mm).

Steel pipe grade: API (American Petroleum Institute) Standard Q125 (carbon steel for oil country tubular goods specified in API 5CT having a tensile yield strength of 125 ksi (862 N/mm$^2$)).

Thread form: dovetail type tapered threads; clearances provided between crests of male threaded portion and roots of female threaded portion, and between stabbing flanks; thread height of about 2 mm; and thread pitch of 8.47 mm.

Sealing surface: taper of 10% and length of contact of 4 mm.

Width of shoulder surface: 5 mm.

Evaluation Method

In the FEM analysis, for each model, the pin was tightened to the point of shouldering (abutment of shoulder surfaces against each other) and further tightened 0.01 turns. In this state, load steps which simulated those in the ISO 13679: 2002 Series A test (a test in which internal and external pressures are repeatedly loaded at ambient temperatures) were sequentially performed. The sealing performance of the external seal was evaluated by comparing the minimum values of the average contact pressures at the sealing surfaces of the external seal, in the internal pressure cycle (the first and second quadrants) and the external pressure cycle (the third and fourth quadrants) in the load step sequence. (It is noted that the higher the minimum value of average contact pressure, the better the sealing performance of the sealing surfaces.)

Evaluations of the sealing performance of the external seal were made by assuming the value of Test No. 4, which exhibited the lowest minimum value of the contact pressure at the external seal, to be 1 and determining, as indices, relative values to this value of Test No. 4. Models having an index of 4 or more were evaluated as being good. The results are shown in Table 1 above.

Test Results

The results shown in Table 1 indicate that the inventive examples of Test Nos. 1 and 2, which satisfy all the conditions specified by the present invention, each exhibited a greater minimum value of the contact pressure at the external seal than the comparative examples of Test Nos. 3 to 6, which do not satisfy each of the conditions specified by the present invention. This demonstrates that the threaded joint for steel pipes of the present embodiment is advantageous in the sealing performance of the external seal.

INDUSTRIAL APPLICABILITY

Threaded joints of the present invention are capable of being effectively utilized in connecting steel pipes that are used as oil country tubular goods.

REFERENCE SIGNS LIST

10: pin, 11: male threaded portion,
11a: crest of male threaded portion, 11b: root of male threaded portion,
11c: stabbing flank of male threaded portion, 11d: load flank of male threaded portion,
12: shoulder surface, 13: sealing surface, 17: complemental sealing surface,
20: box, 21: female threaded portion,
21a: crest of female threaded portion, 21b: root of female threaded portion,
21c: stabbing flank of female threaded portion, 21d: load flank of female threaded portion,
22: shoulder surface, 23: sealing surface, 24: lip portion,
25: nose portion, 26: annular portion, 27: complemental sealing surface,
CL: pipe axis.

The invention claimed is:

1. A threaded joint for steel pipes, comprising: a tubular pin and a tubular box, the pin and the box being fastened by screwing the pin onto the box, the box having an outside diameter less than 104% of an outside diameter of a tubular body having the pin, wherein,
the box comprises, in order from an end of the box toward a tubular body: a lip portion and a tapered female threaded portion, the lip portion including a shoulder surface and a sealing surface,
the pin comprises: a shoulder surface; a sealing surface; and a tapered male threaded portion, the shoulder surface being in contact with the shoulder surface of the box in a fastened state, the sealing surface being in contact with the sealing surface of the box in a fastened state, the tapered male threaded portion engaging with the tapered female threaded portion in a fastened state,
the shoulder surface of the box and the shoulder surface of the pin are inclined with respect to a plane perpendicular to the pipe axis toward a direction in which the screwing of the pin advances,
the lip portion of the box has: a nose portion disposed between the shoulder surface and the sealing surface; and an annular portion disposed between the sealing surface and the female threaded portion,
the nose portion and the annular portion are not in contact with the pin in a fastened state, and
the annular portion has a length along the pipe axis, the length being longer than a thread pitch of the female threaded portion.

2. The threaded joint for steel pipes according to claim 1, wherein,
the pin includes a complemental sealing surface disposed on an end region of the pin and the box includes a complemental sealing surface that is in contact with the complemental sealing surface of the pin in a fastened state.

3. The threaded joint for steel pipes according to claim 1, wherein,
the pin includes a complemental shoulder surface disposed on an end of the pin and the box includes a complemental shoulder surface that is in contact with the complemental shoulder surface of the pin in a fastened state.

4. The threaded joint for steel pipes according to claim 1, wherein,
a circumferential tensile yield strengths of the box in a region including the nose portion and in a region including the sealing surface is at least 105% of a tensile yield strength of the box in a region including the tubular body having the box.

5. The threaded joint for steel pipes according to claim 1, wherein,
in a longitudinal section along the pipe axis, shapes of the sealing surfaces of the box and the pin are each one of the following or a combination of two or more of the following: a straight line; a circular arc; an elliptical arc; and a quadratic curve.

6. The threaded joint for steel pipes according to claim 1, wherein,
the tubular body having the pin has an outside diameter of at least 170 mm.

* * * * *